Jan. 26, 1960 C. J. KENNEDY 2,922,994
ELECTRICAL SIGNAL GENERATORS
Filed March 18, 1957 2 Sheets-Sheet 1

INVENTOR.
CHARLES J. KENNEDY
BY Robert H. Fraser
ATTORNEY

Jan. 26, 1960  C. J. KENNEDY  2,922,994
ELECTRICAL SIGNAL GENERATORS
Filed March 18, 1957  2 Sheets-Sheet 2
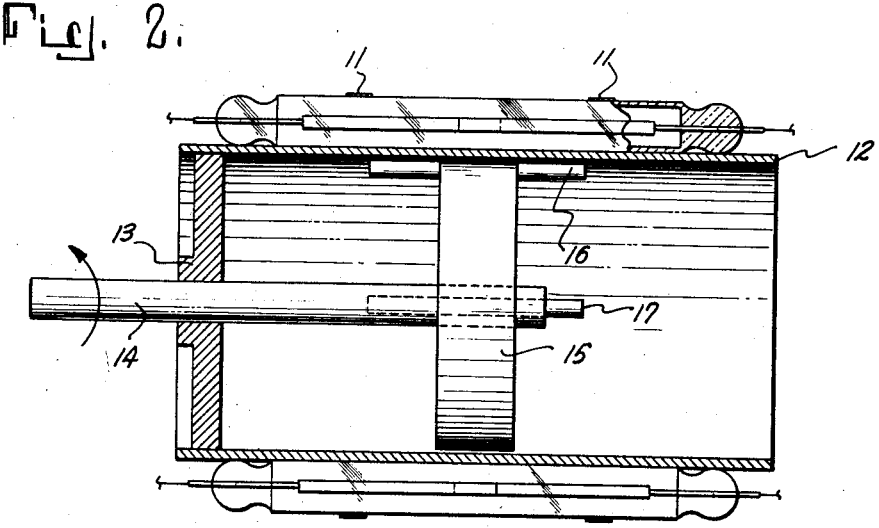
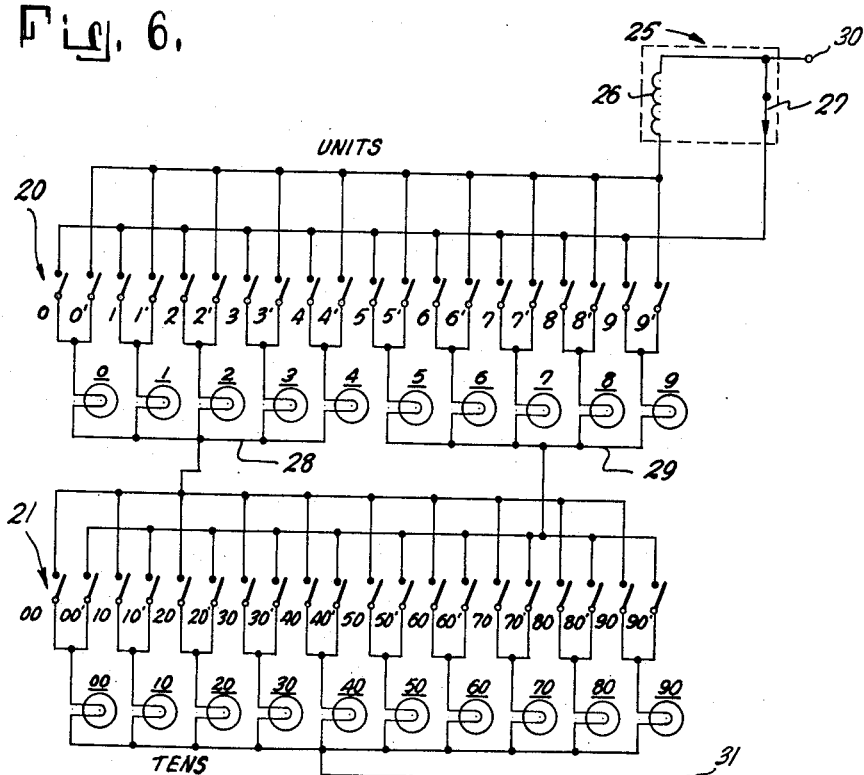
INVENTOR.
CHARLES J. KENNEDY
BY Robert H. Mason
ATTORNEY

United States Patent Office 2,922,994
Patented Jan. 26, 1960

2,922,994

ELECTRICAL SIGNAL GENERATORS

Charles J. Kennedy, Pasadena, Calif., assignor to F. L. Moseley Co., a corporation of California Application March 18, 1957, Serial No. 646,889

7 Claims. (Cl. 340—332)

This invention relates to electrical signal generators and more particularly to an improved electrical signal generator for providing electrical signals in accordance with the position of a movable element.

In the field of data processing, it is frequently necessary to generate electrical signals which represent the position of a movable element, as for example a shaft, the rotational position of which is to be determined.

A device for generating electrical signals in accordance with the rotational position of a shaft may be termed a shaft position indicator and where the signals generated are coded to represent numerical values, the device is sometimes called an analog to digital converter, since the rotational position of a shaft represents a continuous or analog function and the electrical signals numerically indicate the position of the shaft in a predetermined digital code.

A limitation inherent in previously known shaft position indicators arises because an actual mechanical contact or linkage is generally employed between the shaft and electrical circuit contactors to generate the digital electrical signals. Unfortunately, where a high degree of definition is required, as where the position of the shaft must be represented by electrical signals for small increments of shaft rotation, drag on the shaft increases. For example, in a single unit, to increase the definition, the number of switch contacts must be increased which causes an increase in the torque required to turn the shaft. Likewise, if several shaft position indicators are ganged together by means of reduction gears, to increase the definition, the torque required to turn the ganged shaft position indicators is increased. In an attempt to overcome the difficulty of drag, many shaft position indicators generate digital signals in numerical systems other than decimal in order to decrease the total number of switch contacts required. For example, in one type of shaft position indicator, the electrical signals are generated in a binary counting system which substantially reduces the number of required switch contacts. However, even with a binary counting system, a certain amount of drag is presented to the shaft by the shaft position indicator which in a given application may upset the operation of the external apparatus being monitored.

In one type of shaft position indicator, the problem of drag on the shaft is met by engaging the switch contacts with the shaft only when an actual reading is to be taken as to the position of the shaft with the shaft being allowed to turn freely at other times. In addition to the disadvantages arising from the extra mechanism required to engage and disengage the switch contacts from the shaft, devices of this last named type are incapable of continuously monitoring the position of the shaft without undue drag on the shaft.

There has long been a need for a shaft position indicator for generating digital signals in accordance with the position of a movable element which is capable of operation at high speeds without drag upon the shaft; which is capable of a relatively high degree of definition without complicating the apparatus; and which is capable of continuously monitoring the position of a shaft with a minimum of drag and a minimum of internal wear without ambiguity in the output signals.

Accordingly, it is an object of the present invention to provide a shaft position indicator for generating electrical signals in accordance with the position of a movable element with a minimum of frictional drag presented to the movable element.

It is another object of the present invention to provide a shaft position indicator which is capable of continuously monitoring the position of a movable element, while at the same time presenting a minimum of frictional drag to the movable element.

It is still another object of the present invention to provide a new and improved shaft position indicator capable of continuous operation with a minimum of internal wear.

In accordance with the present invention, there is provided a carrier which is adapted to be attached to a movable element, a magnetic field source is fastened to the carrier, a plurality of magnetically actuable switches are mounted adjacent the path of the magnetic field source and a special circuit is interconnected with the switches for generating non-ambiguous electrical signals corresponding to the position of the movable element.

A better understanding of the invention may be had from a reading of the following detailed description and an inspection of the drawings, in which:

Fig. 2 is a sectional view of the shaft position indicator of Fig. 1;

Fig. 6 is a schematic circuit diagram of a shaft position indicator which may be constructed in accordance with the present invention for generating electrical signals representing digital values in decimal notation.

Figure 1:
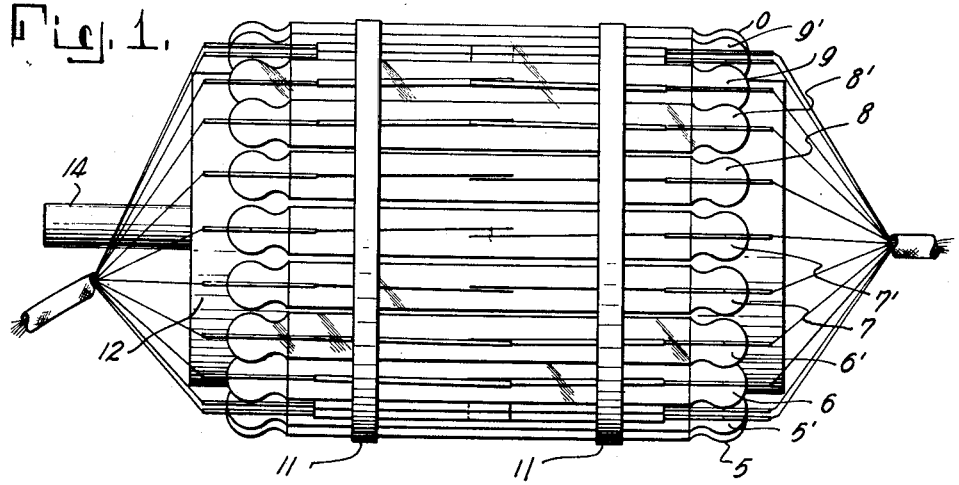
Fig. 1 is a side view of a shaft position indicator constructed in accordance with the invention.
Figure 3:
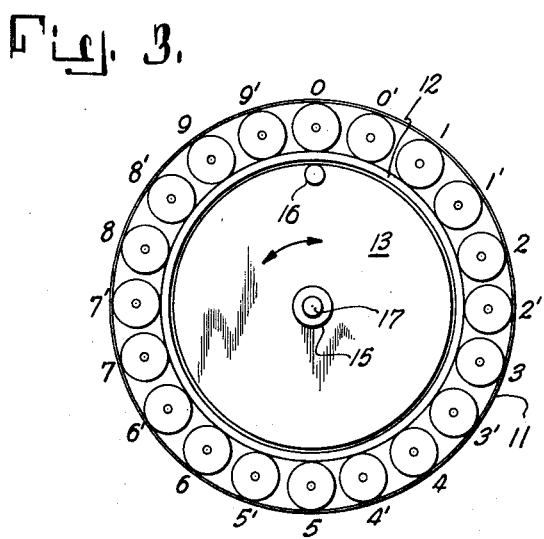
Fig. 3 is a right end view of the shaft position indicator of Fig. 1 with the electrical connections omitted.

In Figs. 1–3 there is shown a shaft position digital encoding switch in which a plurality of magnetically actuatable switches designated 0–9 and 0'–9' are held by a pair of bands 11 around the periphery of a cylinder 12. Both the bands 11 and the cylinder 12 should be constructed of a nonmagnetic material. Each of the switches 0–9 and 0'–9' is of a type which is sealed in a glass tube containing a pair of reeds of magnetic material which are spaced apart at the center of the glass tube. Under the influence of a magnetic field, each pair of reeds is drawn together to make an electrical connection. At each end of the glass tube a wire extends through a glass seal to provide electrical connections to the switch.

A bearing 13 is mounted within the cylinder 12 (Figs. 2 and 3) for supporting a rotatable shaft 14. Attached to the rotatable shaft 14 is a carrier 15 in the form of a rotor. The bearing 13, the shaft 14 and the carrier 15 should be constructed of a nonmagnetic material. The carrier 15 and shaft 14 support a magnetic field source which in the illustrative embodiment is provided by the permanent magnets 16 and 17. The separate fields produced by the magnets 16 and 17 cooperate to form a directional magnetic field which extends through the cylinder 12 adjacent the magnet 16 for actuation of the switches 0–9 and 0'–9'.

The rotatable shaft 14 may be coupled or linked to an external moving element, the position of which is to be determined. As the external moving element changes position, the shaft 14 rotates thereby causing the permanent magnet 16 to follow a path or traverse around the inside of the cylinder 12 adjacent the magnetically actuatable switches 0–9 and 0'–9'. As the permanent magnet 16 follows the traverse the magnetically actuatable switches 0–9 and 0'–9' are sequentially closed one after another.

Although a shaft position indicator may be constructed utilizing magnetically actuated switches in which one switch is assigned to each digital position, an ambiguous readout may result from a gap in which no switch is closed or two switches being closed at a given time. However, by placing two magnetic switches at each digital location and through the use of the special circuitry described below, digital signals are generated in accordance with the movable element representing the position of the movable element at all times and which are free from any ambiguous readout.

Figure 4:
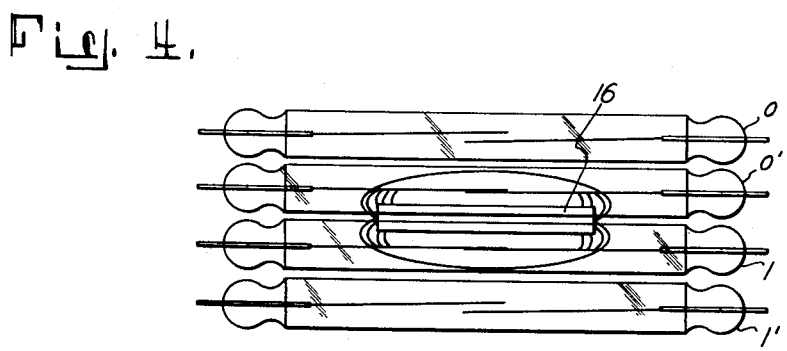
Fig. 4 is a diagrammatic view of four magnetically actuatable switches of the apparatus of Fig. 1 along with a display of a magnetic field.

The manner in which the magnetic field produced by the permanent magnets 16 and 17 operates the switches is illustrated in Fig. 4 in which the magnetic field flux pattern from the magnets 16 and 17 is drawn with the magnet 16 being located between switches 0' and 1 with the switches 0' and 1 being closed. As the magnet 16 changes position toward switch 1' the magnetic field shifts towards switch 1' and the flux pattern tends to follow the magnetic material of the reeds of switch 1' until the field strength reaches a predetermined level at which the reeds of the switch 1' snap into closed position. However, prior to actuation of switch 1' the magnetic field passing through the reeds of the switch 0 decreases to a level at which the reeds of the switch 0 snap open. At the moment the switch 0 opens, the magnetic field strength applied to the switch 1 increases abruptly thereby tending to close the switch 1 in a fast and positive fashion. Accordingly, as the magnetic field travels along the magnetic switches, no more than two of the switches are closed at any given instant and at least one of the switches is closed at all times.

Fig. 6 shows a two decade shaft position indicator in which a units decade 21 and a tens decade 21 are linked together by means of the 10:1 reduction gears 22. Since no mechanical connection to the shaft is required in the shaft position indicator of the invention, very little drag is presented to the shaft and it is therefore possible to couple two or more decades together to increase the definition by enlarging the number of distinctly separate electrical signals which are available for each shaft revolution.

Figure 5:
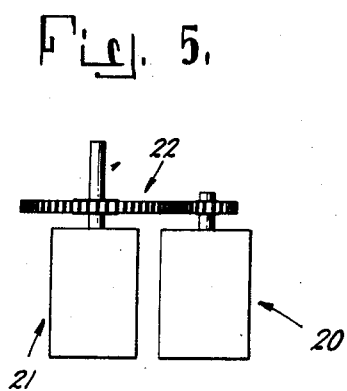
Fig. 5 is a plan view of a two decade shaft position indicator constructed in accordance with the invention.

In Fig. 6 there is shown an electrical circuit for use where a units decade and a tens decade are coupled together as in Fig. 5. The circuit includes the magnetically actuatable switches 0–9 and 0'–9' of the units decade which may comprise a part of the apparatus of Figs. 1–3. The circuit of Fig. 6 is adapted to generate electrical signals representing the position of a movable element in decimal notation to two decimal places, i.e. by the aforementioned set of switches 0–9 and 0'–9' of the units decade 20 and a set of switches 00–90 and 00'–90' of the tens decade 21.

The switches are designated by their numerical position with two switches being located at each digital position as mentioned previously. One of the switches at each location is indicated by the ordinary number such as 0, 1, 2, 3, 4 etc. or 00, 10, 20, 30, 40 etc. while the other of the switches at each digital position is indicated by a prime number as for example, 0', 1', 2', 3', etc. or 00', 10', 20', 30' etc. The pair of switches at each of the digital locations is connected to an individual circuit in which the electrical signal of that digital value is generated. For convenience, electrical signal lights 0–9 and 00–90 are shown connected in the circuits, but it will be appreciated that other devices may be substituted for the signal lights, such as relay coils for actuating punchcard devices, magnetic recorders, or input devices for digital computers.

As the magnetic switches are successively closed in the units decade 20, a relay 25 including a coil 26 and a pair of contacts 27 is energized to switch the signal lights from the switches 0–9 to the switches 0'–9'. The coil 26 is connected in series with all of the prime numbered switches 0', 1', 2', 3' etc. Thus, whenever one of the prime numbered switches is closed the coil 26 is actuated and the relay contacts 27 are opened. In contrast, when no prime numbered switch is actuated and only the regular numbered switches are actuated, the relay coil 26 is not energized and the contacts 27 are closed. Accordingly, where the magnetic field passes along the switches as indicated in Fig. 4, the relay 25 opens and closes to switch the electrical connection from the regular numbered switch to the prime numbered switch of each digital location in succession. Thus, when the field travels from the switch labeled 0 towards the switch labeled 9' the relay 25 opens and closes to send current in succession through the switches in the following order:

0, 0', 1, 1', 2, 2', 3, 3', 4, 4', 5, 5', 6, 6', 7, 7', 8, 8', 9, 9'

As the current flows through the switches in the aforementioned order, the signal lights 0–9 corresponding to each of the digital positions 0 through 9 are sequentially energized thereby indicating the position of the magnetic field which corresponds to the position of the movable element.

Where two decades are connected together by means of reduction gears as shown in Fig. 6, the magnetic switches of the tens decade 21 may be connected as shown in Fig. 5. By connecting the lower five signal lights 0–4 to a common connection 28 and the upper five signal lights 5–9 to a common connection 29, the regular numbered switches 00–90 and prime numbered switches 00'–90' of the tens decade may be alternately energized in a fashion similar to the alternate energizing of the switches 0–9 and 0'–9' of the units decade from the relay 25.

The circuit of Fig. 6 is adapted to be energized from a suitable source of power (not shown) which may be connected to the terminals 30 and 31. In operation, the signal lamps 0–9 are energized in accordance with the position of the shaft of the units decade 20 and the signal lamps 00–90 are energized in accordance with the position of the tens decade 21. Thus, an indication of the position of a shaft is provided to the nearest 1/100 of a revolution by reference to the signal lamps 0–9 and 00–90.

Although the illustrative embodiment is adapted to generate signals in a decimal notation, the invention is not limited thereto. By suitable adaptation of the circuit of Fig. 6, a shaft position indicator may be had which operates in any numerical system, as for example, binary or quinary. Likewise, additional decades may be linked to the apparatus of Fig. 2 to increase the resolution. However, since the shaft position indicator of the invention requires very little torque to turn the shaft, the numerical system may be chosen to correspond to the type of output signals desired without the need for any type of code translator. Thus, in contrast to previously known shaft position indicators, resort need not be had to other numerical systems to increase the resolution where the torque required to turn the shaft must be kept at a minimum.

What is claimed is:

1. An indicator for generating signals in accordance with the position of a movable element including the combination of a carrier linked to the movable element, a magnetic field source attached to the carrier, said carrier being adapted to position the magnetic field source along a predetermined traverse in accordance with the position of the movable element, a plurality of pairs of magnetically actuatable switches mounted adjacent and along the traverse of the magnetic field source, each of said magnetically actuatable switches being operable to provide an electrical connection when the magnetic field source is adjacent the switch with an adjacent two of said switches being actuated by the magnetic field source at a time, a first common circuit connected serially with a first switch of each pair of switches, a second common circuit connected serially with a second switch of each pair of switches, and switching means connected to said first and second common circuits for alternately enabling the circuits to the first and second switches of each pair of switches whereby an output signal derived from the actuated switches indicates the position of the movable element.

2. An indicator in accordance with claim 1 in which the switching means comprises a relay coil connected serially with the first common circuit and a set of contacts associated with the relay coil connected serially with the second common circuit.

3. A shaft position indicator including the combination of a rotatable shaft, a rotor attached to the rotatable shaft, a magnetic field source attached to the rotor, a cylinder of non-magnetic material concentrically disposed around the rotor, a plurality of magnetically actuatable switches spaced at regular intervals around the cylinder with two of the magnetically actuatable switches corresponding to each digital location, a plurality of indicator circuits connected serially with each two switches of a digital location, and switching means connected to the plurality of switches for alternately enabling the circuits to each of the two switches of a digital location to pass current in accordance with the position of the magnetic field source whereby a non-ambiguous electrical signal indicative of the position of the shaft appears in said indicator circuits.

4. A shaft position indicator in accordance with claim 3 in which the switching means comprises a relay coil connected serially with first like ones of the switches of each digital location and a set of relay contacts connected serially with second like ones of the switches of each digital location.

5. A device for generating electrical signals in accordance with the position of a movable element including in combination a rotatable shaft, a rotor attached to the rotatable shaft, a permanent magnet fastened to the periphery of the rotor, a cylinder of non-magnetic material surrounding the rotor, a plurality of magnetically actuatable switches mounted around the periphery of the cylinder, each of said magnetically actuatable switches including a pair of reeds of magnetic material which are adapted to be drawn together to form an electrical connection when subjected to a magnetic field, said permanent magnet attached to the rotor being adapted to actuate at least one of the magnetically actuatable switches corresponding to the rotational position of the shaft, a permanent magnet fastened to the shaft which cooperates with the permanent magnet attached to the rotor to produce a magnetic field extending through the cylinder and engaging selected ones of the magnetically actuatable switches in accordance with the rotational position of the shaft, and an electrical circuit connected to the magnetically actuatable switches for generating electrical signals in accordance with the rotational position of the shaft.

6. A shaft position indicator for generating electrical signals in accordance with the position of a movable element including in combination a rotatable shaft, a rotor attached to the rotatable shaft, a permanent magnet fastened to the periphery of the rotor, a cylinder of non-magnetic material surrounding the rotor, a plurality of magnetically actuatable switches mounted around the periphery of the cylinder, each of said magnetically actuatable switches including a pair of reeds of magnetic material which are adapted to be drawn together to form an electrical connection when subjected to a magnetic field, said permanent magnet attached to the rotor being operable to actuate an adjacent two of the magnetically actuatable switches corresponding to the rotational position of the shaft, a first common circuit connected to a first set of alternate ones of the plurality of switches, a second common circuit connected to a second set of alternate ones of the plurality of switches interleaved with the first set, a plurality of indicator circuits connected to adjacent ones of the plurality of switches from both said first and second sets, and switching means connected between said first and second common circuits for alternately enabling each of said sets of switches to conduct current to the indicator circuits in accordance with the position of the permanent magnet whereby a non-ambiguous output signal is derived representing the position of the movable element.

7. A shaft position indicator for generating electrical signals in accordance with the position of a movable element including in combination a rotatable shaft, a rotor attached to the rotatable shaft, a permanent magnet fastened to the periphery of the rotor, a cylinder of non-magnetic material surrounding the rotor, a plurality of magnetically actuatable switches mounted around the periphery of the cylinder, each of said magnetically actuatable switches including a pair of reeds of magnetic material which are adapted to be drawn together to form an electrical connection when subjected to a magnetic field, said permanent magnet attached to the rotor being operable to actuate an adjacent two of the magnetically actuatable switches corresponding to the rotational position of the shaft, a permanent magnet fastened to the shaft which cooperates with the permanent magnet attached to the rotor to produce a magnetic field concentrated in the region of the two switches adjacent the permanent magnet fastened to the periphery of the rotor, a first common circuit connected to a first set of alternate ones of the plurality of switches, a second common circuit connected to a second set of alternate ones of the plurality of switches interleaved with the first set, a plurality of indicator circuits connected to adjacent ones of the plurality of switches from both said first and second sets, and switching means connected between said first and second common circuits for alternately enabling each of said sets of switches to conduct current to the indicator circuits in accordance with the position of the permanent magnet whereby a non-ambiguous output signal is derived representing the position of the movable element.

References Cited in the file of this patent

UNITED STATES PATENTS

| | | |
|---|---|---|
| 1,853,734 | Lang | Apr. 12, 1932 |
| 2,502,837 | Entz et al. | Apr. 4, 1950 |
| 2,666,912 | Gow et al. | Jan. 19, 1954 |

FOREIGN PATENTS

| | | |
|---|---|---|
| 277,787 | Great Britain | Sept. 29, 1927 |
| 395,717 | Great Britain | July 14, 1933 |